March 1, 1966  C. L. SMITH  3,237,484
REVERSIBLE DRIVE FOR POWER TOOLS
Filed Feb. 28, 1963
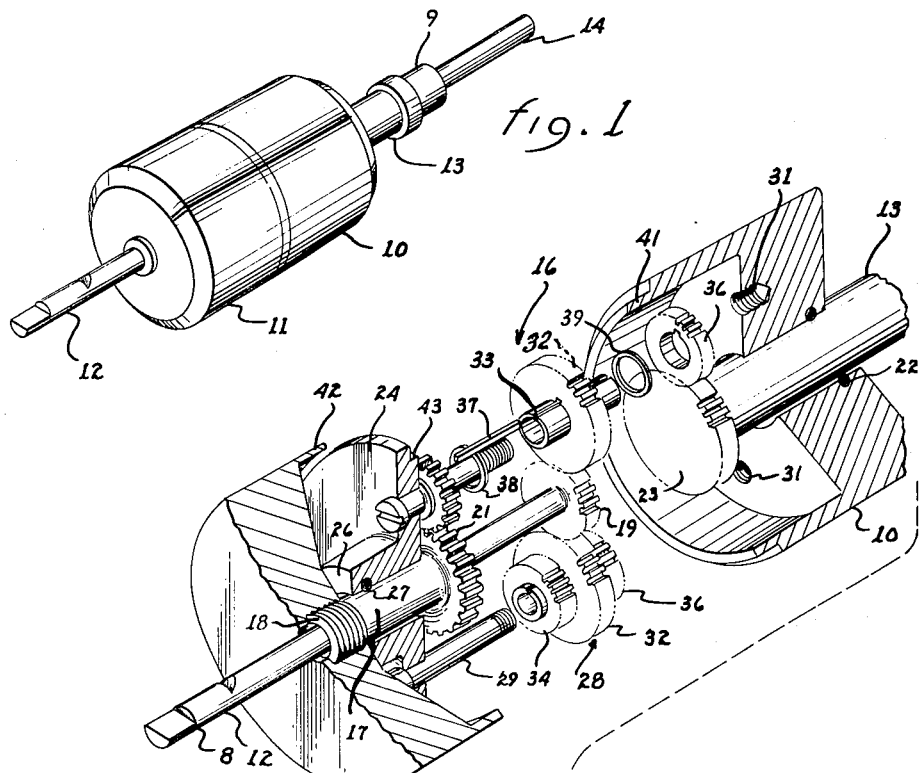
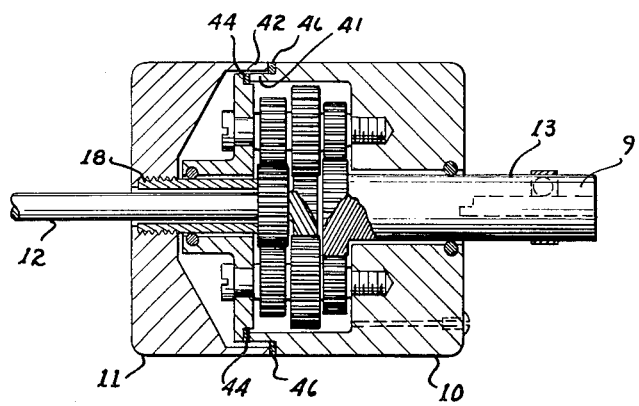
INVENTOR.
CHARLES L. SMITH
BY
John J. McLaughlin
ATTORNEY United States Patent Office 3,237,484
Patented Mar. 1, 1966

3,237,484
REVERSIBLE DRIVE FOR POWER TOOLS
Charles L. Smith, 3339 E. Grant Road, Tucson, Ariz.
Filed Feb. 28, 1963, Ser. No. 261,700
10 Claims. (Cl. 74—762)

My invention relates to a reversible drive unit for hand-operated power tools. The present invention is a continuation-in-part of my prior application Serial No. 27,640, filed May 9, 1960, now Patent No. 3,165,947.

The principal object of the invention is the provision of an improved readily reversible drive unit for power tools.

Another object is the provision of a simple reversible drive unit comprising a by-part housing wherein the driven shaft will rotate in one direction when one part of the housing is held in the hand, and in the opposite direction when the other housing is held in the hand.

A further object of the invention is the provision of an improved rugged but inexpensive unit for forward or reverse drive of a hand-operated tool.

A preferred embodiment of the invention is shown in the attached drawings wherein:

FIG. 1 is a perspective view of the unit;
FIG. 2 is an enlarged, expanded view with some parts in section to illustrate structural features; and
FIG. 3 is a longitudinal sectional view taken through FIG. 1.

In accordance with the main features of the invention, the drive of the present invention comprises a housing having a forward portion 10 and a rear portion 11. An input shaft 12 journaled in the rear housing portion, is adapted to be secured in the chuck of a suitable drive motor; and an output shaft 13 journaled in the forward housing portion, is adapted to support a suitable small tool 14. The input shaft is shaped at 8 to engage in the chuck of a small hand-operated drill motor (not shown). The output shaft carries a chuck 9 for drive engagement of the shank of this small tool 14. Reference may be made to my copending application above identified for the identification of a chuck of a small hand-held drill motor, but any common conventional chuck may be used.

A gear assembly indicated generally by the reference character 16 in FIG. 2 is supported within the housing and is so designed that when the forward housing portion 10 is held stationary by the hand, the input shaft is rotated—rotation will normally be in a clockwise direction looking forwardly of the shaft—the output shaft 13 will be driven in the same direction. When the rear housing portion 11 is held in the hand, however, the output shaft 13 will be driven in a reverse direction. If we assume the normal direction of rotation of the driving motor, and also assume that the tool 14 is a screwdriver, the forward housing portion would therefore be held to drive the screws home and tighten them; while the rear housing portion 11 would be held to withdraw the screws. Nuts, bolts, drills and other small tools would obviously be operable in the same way.

The input shaft 12 is journaled in a sleeve 17 which is secured by threads 18 in a thickened end wall of the rear housing portion 11. The input shaft 12 has an integral driving gear 19, and the sleeve 17 functionally integral with the rear housing portion has a control gear in the form of an integral sun gear 21 coaxial with the driving gear 19, but spaced therefrom as shown particularly in FIG. 3. The input shaft 12 and the driving gear 19 may be thought of as comprising one sub-assembly associated with the rear housing portion; while the rear housing portion 11, sleeve 17, and sun gear 21 may be considered as representing a second sub-assembly.

The forward housing portion 10 supports the output shaft 13 rotatably and an O-ring 22 acts as a seal between the thickened end portion of the forward housing member and the output shaft 13. A driven gear 23 is carried by the output shaft within the housing. The driven gear 23, output shaft 13, and forward housing portion 10 may be considered as a third sub-assembly for production and assembly purposes. A face plate 24 has a hub portion 26 journaled on the sleeve 17 so that it may rotate with respect thereto. An O-ring 27 functions as a seal between the outer surface of the sleeve 17 and the inner cylindrical surface of the hub 26 without limiting rotatory movement between such face plate and sleeve. A plurality of planetary gear assemblies indicated generally by the reference character 28 as secured between the face plate 24 and the forward housing portion 10 by means of cap screws 29 on which planetary gear assemblies 28 are free to rotate. The ends of the cap screws 29 are engaged in threaded holes 31 in the thickened end of the forward housing portion 10.

The planetary gear assemblies 28 rotate as functionally integral assemblies. They may be produced in many ways to obtain this result, and I show in the drawings one simple satisfactory construction. A center gear 32 of relatively large diameter is provided with an integral hub 33 projecting from both sides of the gear 32 and smaller pinion gears 34 and 36 are supported on this hub. A key 37 engages in suitable keyways in the three gears. Spacing rings 38 and 39 are disposed between the large gear 32 and the smaller gears 34 and 36 respectively to facilitate their engagement with the sun gear 21, driving gear 19, and driven gear 23 respectively. The hub 33 projects slightly beyond the gears 34 and 36 so that the projecting ends may function as spacers between the planetary gear units 28 the face plate 24 on one side, and the forward housing portion 10 on the other side.

The annular side of the forward housing portion has a reduced diameter projection 41. An annular projection 42 on the rear housing portion extends over the projection 41 so as to produce an overlap as shown particularly in FIG. 3. The face plate 24 has an annular recess forming a shoulder 43 against which the projection 41 abuts. Packing rings 44 and 46 are supported in the positions shown in FIG. 3 and they seal both the space between the face plate 24 and the forward housing portion and the space between the outside edges of the forward and rear housing portions.

I have already pointed out that when the forward housing portion 10 is held stationary, rotation of the output shaft 13 will be in same direction as the input shaft 12. It will be noted, by reference particularly to FIG. 2, that the forward housing portion 10, face plate 24, and planetary gear assembly 28, together with the output shaft 13, in effect form a single assembly. The driven gear 23 and output shaft 13 can, however, rotate with respect to the forward housing portion 10, face plate 24, and planetary gear unit 28. The planetary gear assembly 28 cannot orbit around the control sun gear 21 unless the forward housing portion 10 is free to rotate with it. When the forward housing portion is being held stationary, therefore, the control sun gear 21 is also held stationary, and the gears comprising the gear assembly 16 act as ordinary spur gears in which the planetary gear assembles 28 are the idler gears. When gear 19 is rotated in a forward direction, gear 32 will be rotated as an idler gear in a reverse direction. Since gear 36 is forced to rotate with gear 32, it also will rotate in a reverse direction. But gear 36 meshes with the driven gear 23 and it therefore turns the gear 23 in a forward direction, and the output shaft is rotated forwardly with the driven gear 23.

When the rear housing portion is held stationary and the forward housing portion released, the latter is then free to rotate. The planetary gear unit 28, therefore, can also rotate. But when the gear unit 28 rotates and sun gear 21 is held stationary with the rear housing portion, it is orbited around said sun gear 21. As it orbits, the planetary gear unit 28 must carry with it the entire assembly comprising the forward housing portion 10, driven gear 23, and the output shaft 13. This rotatory movement is in a direction reverse to that of the input shaft.

If there is a difference in the diameters and number of teeth of the two gears 34 and 36, there will be some movement of the output shaft with respect to the forward housing portion, and this movement may be in either direction with respect to the forward housing portion and at various speeds with respect to said forward housing portion, depending upon the design of the gear system. It should be noted also that the device of the present invention may be designed for slower forward drive where objects to be driven such as screws will normally encounter greater resistance; but the reverse drive may be at a higher rate of speed which is permissible and desirable when a screw, nut, bolt or the like is being retracted.

It should be understood that many modifications of the device of the present invention may be adopted without departing from the spirit and scope of the invention. Thus, for example, the unit is designed to be pre-packed with oil or grease, but other means of lubrication may be employed. I refer to the fact that there may be a plurality of planetary gear units, and in the drawings I show two such units for balance. It is obvious that there must be at least one planetary drive unit, but otherwise the number may be varied; two or three such units supported to provide proper balance normally produce very good results. The size of the unit may vary, but generally speaking, I have obtained very good results in a unit which is about three and one-half inches long and two and seven-eighths inches in diameter. Such a unit is very effective for use with a small drill motor for the operation of small hand tools. Almost any desired speed of the output shaft may be obtained with respect to the input shaft. The very big advantage of the present invention, outside of the ruggedness, relatively low cost, and unusual gear ratios that may be obtained, is the fact that the operator may go quickly to drive in either direction without any manipulative procedure whatsoever except to shift his grip from one housing portion to another.

I prefer, in the design and construction of the device of my present invention that forward drive occur when the forward housing portion is held stationary, that reverse drive be at a slower rate than forward drive, and that both forward and reverse drive of the output shaft be at a slower speed than that of the input shaft. None of these features is required, however. Generally speaking for example, faster speed of the output shaft may be obtained by making gear 32 smaller than gears 34 and 36, with the gears with which they mesh correspondingly modified. Other drive relations may be obtained, for example, by making the driving gear larger than either or both of the driving and driven gears, or by modifying the relative size of the latter two gears, for example.

A preferred embodiment of the present invention has been shown in the drawings and described in detail in the specification, but the scope of the invention is defined by the claims.

I claim:

1. A compact reversible drive unit for hand-operated power tools comprising:
   (a) a housing having separate forward and rear portions,
   (b) an input shaft journaled in said rear housing portion, and supported thereby,
   (c) a driving gear carried by said input shaft and disposed within the housing,
   (d) an output shaft journaled in the forward housing portion and supported thereby, said output shaft having means for driving engagement of the shank of a small hand tool or the like,
   (e) a driven gear carried by said output shaft within the housing,
   (f) a control gear carried by the rear housing portion,
   (g) said driving gear, driven gear and control gear being axially aligned, and
   (h) a planetary gear unit rotatably supported within the housing, said unit comprising three functionally integral gears meshing respectively with said control gear, driving gear and driven gear,
   (i) said planetary gear unit secured between said forward housing portion and a face plate, said face plate secured to said forward housing portion and journaled on said rear housing portion,
   (j) whereby, when the rear housing portion is held stationary said planetary gear unit orbits around said control gear to drive the output shaft in one direction; and when the forward housing portion is held stationary, the said planetary gear unit acts as an idler between the driving and driven gears, and the output shaft is driven in an opposite direction.

2. A compact reversible drive unit for hand-operated power tools comprising:
   (a) a housing having forward and rear portions,
   (b) an input shaft journaled in said rear housing portion and supported thereby, said input shaft shaped to be engaged by a chuck of a small drill motor (not shown),
   (c) a driving gear carried by said input shaft and disposed within the housing,
   (d) an output shaft journaled in the forward housing portion and supported thereby, said output shaft having a chuck for driving engagement of the shank of a small hand tool or the like,
   (e) a driven gear carried by said output shaft within the housing,
   (f) a sun gear carried by the rear housing portion,
   (g) said driving gear, driven gear and sun gear being axially aligned,
   (h) a shaft carried by the forward housing portion, and
   (i) a planetary gear unit rotatably supported on said shaft and comprising three coaxial functionally integral planetary gears meshing respectively with said sun gear, driving gear and driven gear,
   (j) said planetary gear unit secured between said forward housing portion and a face plate, said face plate secured to said forward housing portion and journaled on said rear housing portion.

3. A compact reversible drive unit for hand-operated power tools comprising:
   (a) a housing having forward and rear portions,
   (b) an input shaft journaled in said rear housing portion and supported thereby, said input shaft shaped to be engaged by a chuck of a small drill motor (not shown),
   (c) a driving gear carried by said input shaft and disposed within the housing,
   (d) an output shaft journaled in the forward housing portion and supported thereby, said output shaft having a chuck for driving engagement of the shank of a small hand tool or the like,
   (e) a driven gear carried by said output shaft and larger than said driving gear,
   (f) a sun gear carried by the rear housing portion,
   (g) said driving gear, driven gear and sun gear being axially aligned,
   (h) a shaft carried by the forward housing portion, and
   (i) a planetary gear unit rotatably supported on said shaft and comprising three coaxial functionally integral planetary gears meshing respectively with said sun gear, driving gear and driven gear, (j) said planetary gear unit secured between a face plate and said forward housing portion, said face plate secured to said forward housing portion and journaled on said rear housing portion.

4. A compact reversible drive unit for hand-operated power tools comprising:
(a) a housing having forward and rear portions,
(b) an input shaft journaled in said rear housing portion and supported thereby, said input shaft shaped to be engaged by a chuck of a small drill motor (not shown),
(c) a driving gear carried by said input shaft and disposed within the housing,
(d) an output shaft journaled in the forward housing portion and supported thereby, said output shaft having a chuck for driving engagement of the shank of a small hand tool or the like,
(e) a driven gear carried by said output shaft within the housing,
(f) a sun gear larger than said driving gear,
(g) said driving gear, driven gear and sun gear being axially aligned,
(h) a shaft carried by the forward housing portion, and
(i) a planetary gear unit rotatably supported on said shaft and comprising three coaxial functionally integral planetary gears meshing respectively with said sun gear, driving gear and driven gear,
(j) said planetary gear unit secured between said forward housing portion and a face plate, said face plate secured to said forward housing portion and journaled on said rear housing portion.

5. A compact reversible drive unit for hand-operated power tools comprising:
(a) a housing having forward and rear portions,
(b) an input shaft journaled in said rear housing portion and supported thereby, said input shaft shaped to be engaged by a chuck of a small drill motor (not shown),
(c) a driving gear carried by said input shaft and disposed within the housing,
(d) an output shaft journaled in the forward housing portion and supported thereby, said output shaft having a chuck for driving engagement of the shank of a small hand tool or the like,
(e) a driven gear carried by said output shaft within the housing,
(f) a sun gear smaller than said driven gear and carried by the rear housing portion,
(g) said driving gear, driven gear and sun gear being axially aligned,
(h) a shaft carried by the forward housing portion, and
(i) a planetary gear unit rotatably supported on said shaft and comprising three coaxial functionally integral planetary gears meshing respectively with said sun gear, driving gear and driven gear,
(j) said planetary gear unit secured between said forward housing portion and a face plate, said face plate secured to said forward housing portion and journaled on said rear housing portion.

6. A compact reversible drive unit for hand-operated power tools comprising:
(a) a housing having forward and rear portions,
(b) an input shaft journaled in said rear housing portion and supported thereby, said input shaft shaped to be engaged by a chuck of a small drill motor (not shown),
(c) a driving gear carried by said input shaft and disposed within the housing,
(d) an output shaft journaled in the forward housing portion and supported thereby, said output shaft having a chuck for driving engagement of the shank of a small hand tool or the like,
(e) a driven gear carried by said output shaft within the housing, (f) a sun gear carried by the rear housing portion,
(g) said driving gear, driven gear and sun gear being axially aligned,
(h) a shaft carried by the forward housing portion,
(i) a planetary gear unit rotatably supported on said shaft and comprising three coaxial functionally integral planetary gears meshing respectively with said sun gear, driving gear and driven gear, and
(j) said driving gear being smaller than both said sun gear and driven gear, and said sun gear being smaller than said driven gear, said planetary gears all being of a different size to mesh with said sun gear, driving gear and driven gear respectively and provides them different gear ratios,
(k) said planetary gear unit secured between said forward housing portion and a face plate, said face plate secured to said forward housing portion and journaled on said rear housing portion.

7. A compact reversible drive unit for hand-operated power tools comprising:
(a) a housing having forward and rear portions,
(b) a sleeve secured to said rear housing portion,
(c) an input shaft journaled in said sleeve and supported thereby, said input shaft shaped to be engaged by a chuck,
(d) a driving gear carried by the input shaft within the housing,
(e) a sun gear carried by said sleeve within the housing but spaced therefrom, said sun gear being spaced from but concentric with the driving gear,
(f) a face plate journaled on said sleeve and mounted securely to the forward housing portion,
(g) an output shaft journaled in the forward housing portion and supported thereby, said output shaft in concentric relation with the input shaft, said output shaft having a chuck for driving engagement of the shank of a small hand tool or the like,
(h) a driven gear carried by the output shaft within the housing, and
(i) a planetary gear unit rotatably supported between the said face plate and forward housing portion, said planetary gear unit having three mutually aligned, functionally integral planetary gears engaging respectively said sun gear, driving gear and driven gear.

8. A compact reversible drive unit for hand-operated power tools comprising:
(a) a housing having forward and rear portions;
(b) a sleeve secured to said rear housing portion,
(c) an input shaft journaled in said sleeve and supported thereby, said input shaft shaped to be engaged by a chuck,
(d) a driving gear carried by the input shaft within the housing,
(e) a sun gear carried by said sleeve within the housing but spaced therefrom, said sun gear being spaced from but concentric with the driving gear,
(f) a face plate journaled on said sleeve and mounted securely to the forward housing portion,
(g) an output shaft journaled in the forward housing portion and supported thereby, said output shaft in concentric relation with the input shaft, said output shaft having a chuck for driving engagement of the shank of a small hand tool or the like,
(h) a driven gear carried by the output shaft within the housing,
(i) a planetary gear unit rotatably supported between the said face plate and forward housing portion, said planetary gear unit having three mutually aligned, functionally integral planetary gears engaging respectively said sun gear, driving gear and driven gear, and
(j) said sun gear, driving gear and driven gear all having different diameters, and said three planetary gears also having different diameters to provide three different gear ratios among the three pairs of meshing gears.

9. A reversible drive unit comprising:
(a) a rear frame portion,
(b) a sleeve carried by the rear frame portion,
(c) an input shaft journaled in said sleeve, said input shaft shaped to be engaged by a chuck, of a small drill motor (not shown).
(d) a driving gear carried by said input shaft,
(e) a sun gear carried by the sleeve in spaced relation with said driving gear,
(f) a forward frame portion,
(g) an output shaft journaled in said forward frame portion in alignment with the input shaft, said output shaft having a chuck for driving engagement of the shank of a small hand tool or the like,
(h) a driven gear carried by the output shaft,
(i) a face plate rotatably supported on said sleeve and mounted securely to the forward housing portion,
(j) a planetary gear unit rotatably supported between said face plate and forward frame portion, having three functionally integral gears meshing with said sun gear, driving gear and driven gear, and
(k) means for holding said rear frame portion and forward frame portion in assembled, mutually relatively rotatable relation.

10. A reversible drive unit comprising:
(a) a housing having forward and rear portions, each such portion being generally cup-shaped with an end and integral annular side portion,
(b) a sleeve threaded in said end of said rear housing portion,
(c) a sun gear on a free end of said sleeve,
(d) an input shaft journaled in said sleeve, said input shaft shaped to be engaged by a chuck of a small drill motor (not shown).
(e) a driving gear integral with the input shaft in axial alignment with but spaced from the sun gear, said driving gear smaller than said sun gear,
(f) a face plate having a hub rotatably supported on the sleeve, and mounted securely to the forward housing portion,
(g) an output shaft journaled in the forward housing portion in alignment with the input shaft, said output shaft having a chuck for driving engagement of the shank of a small hand tool or the like,
(h) a driven gear carried by the output shaft in spaced relation to said driving gear,
(i) three functionally integral planetary gears rotatably supported between the face plate and forward housing portion and meshing respectively with the sun gear, driving gear and driven gear,
(j) an annular shoulder on the face plate forming an annular recess facing the forward housing portion,
(k) a smaller diameter annular projection from the forward housing portion extending into said recess on said face plate, and
(l) a major diameter portion on said rear housing portion overlapping said smaller diameter annular projection on said forward housing portion.

References Cited by the Examiner
UNITED STATES PATENTS
2,694,470   11/1954   Grendron _____ 74—762

DAVID J. WILLIAMOWSKY, *Primary Examiner.*

DON A. WAITE, *Examiner.*

H. S. LAYTON, *Assistant Examiner.*